Figure 1:
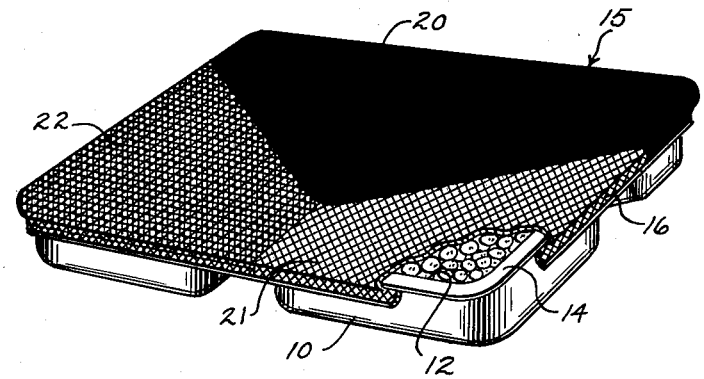

March 5, 1963   F. O. NELSON   3,079,913
COMPARTMENTED CONTAINER ARRANGED TO SIMULTANEOUSLY HEAT
FOOD IN THE VARIOUS SECTIONS AT DIFFERING HEAT RATES
Filed Oct. 27, 1960

INVENTOR
FRED O. NELSON

BY

ATTORNEY

United States Patent Office 3,079,913
Patented Mar. 5, 1963

3,079,913
COMPARTMENTED CONTAINER ARRANGED TO SIMULTANEOUSLY HEAT FOOD IN THE VARIOUS SECTIONS AT DIFFERING HEAT RATES
Fred O. Nelson, Overland Park, Kans., assignor to Milprint, Inc., Milwaukee, Wis., a corporation of Delaware
Filed Oct. 27, 1960, Ser. No. 65,482
3 Claims. (Cl. 126—390)

The present invention relates to commodity containers, and in particular, to compartmented commodity containers which may be adapted for containing a variety of commodities, such as food courses comprising a meal and including an entree, vegetable and potatoes, or rice, and wherein the commodities contained within the compartments for some reason, such as the composition thereof and/or bulk, require heating to differing temperature gradients, and wherein the entire container is to be heated as a closed unit in an oven or the like wherein the ambient temperature affecting the container will be the same for all portions thereof.

The present invention contemplates the provision of a container having compartmented sections which are respectively arranged to contain a selected edible or other commodity wherein the commodity, such as food, is adapted to be prepared by heating the same prior to serving, and wherein the container includes portions thereof forming wall surfaces (which may comprise areas of a removable lid) for each of the sections, which portions are normally of heat-reflective material, and wherein selected exterior surface areas of the portions adjacent respective ones of the compartmented sections are respectively printed or otherwise opaquely coated with an ink in a lacquer base or paint wherein the said coating is applied in varying degree of spaced dispersion depending on the surface portion involved to thereby effect desired radiant heat transmission characteristics to a particular compartmented section, and wherein the said characteristics will differ from area to area.

The present invention contemplates the general teachings of co-pending application for Commodity Container filed by Milton E. Griem on October 27, 1960, bearing Serial No. 65,325, and assigned to the same assignee as the present invention. That is, it is desired to coat by means of painting or printing or otherwise covering selected adjacent wall portions of a food container having respective compartmented sections with a material having a general heat-absorbent characteristic. However, there is herein contemplated application of such material in selected degree, such as by, for instance, applying an all over coating of the material to a particular section and by cross hatching ruling or otherwise depositing the coating on other areas of the container in such spaced dispersion to be more or less concentrated as desired. The present invention further contemplates the printing or otherwise applying of the heat-absorbent material by other means, such as stippling or in other configuration to vary the degree of coverage of the selected area.

It is a particular object of the present invention to provide a lid for a compartmented container wherein certain defined areas thereon, corresponding to commodity-containing compartments of said container will selectively transmit heat interiorly thereof when the entire container is placed in an oven or the like at a desired temperature affecting the lid-enclosing container as a whole, and wherein the lid may be made of roll stock metal foil, such as aluminum foil, printed in accordance with the usual printing practices, and with the usual printing inks and adhering bases for the inks, and further selecting deposited configurations to impart areas of varying degree of spaced coating dispersion corresponding to the said defined areas of the lid.

It is another object of the present invention to provide a commodity container wherein the container is sectioned into adjacent compartments and wherein the exterior surfaces of the compartments (which may comprise a removable lid therefor) are coated with a heat-absorbing material of varying spaced dispersion for a given area thereon corresponding to a respective compartment of the container and which thereby provide relatively differing heat transmission characteristics thereto.

Figure 2:
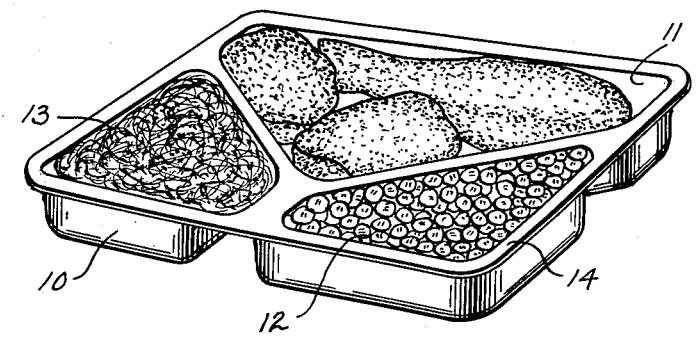

Referring now to the drawings:

FIG. 1 is a perspective view of a compartmented food container embodying the present invention, and so constructed as to include a removable lid having areas thereof coated, for instance by means of printing, with materials having heat-absorbent characteristics, and wherein said areas are of a configuration substantially identical to that defined by the adjacent compartments of the container, and wherein the said areas are coated with the material in differing degrees of spaced dispersion;

FIG. 2 is a perspective view of the container with the aforementioned lid removed and illustrating a variety of meal serving courses contained in the several compartments.

With reference to the drawing figures, it will be apparent that the present invention may be readily embodied in conventional type containers for individual meal servings wherein a container 10 is sectioned off to provide separate compartments 11, 12 and 13, which may, for purposes of illustration, contain an entree, a potato course and a vegetable, respectively. The containers 10 are of the type presently available and are generally of fabricated aluminum sheet stampings with continuous rolled or beaded top marginal edges 14.

With particular reference to FIG. 1, it will be noted that the container 10 is provided with a removable lid denoted generally by the reference numeral 15, and embodying the teachings of the present invention. The lid 15 may be fabricated from conventional roll stock aluminum having reflective surfaces and is preferably adapted to include an overhanging marginal edge 16 which is arranged for crimping or pressing engagement with the marginal edge 14 of the compartmented container 10. Thus, the commodities may be placed in the respective sectioned compartments 11, 12 and 13 by the processor and the lid 15 fastened in place. In the case of food, it is often desirable to precook the food and place it in the container and cover the same prior to freezing. The entire covered container is then maintained at or below freezing temperature until the purchaser is ready to consume the contents. As is often the case, a container with the frozen goods is placed directly in an oven while the goods are in a frozen state and heated for a given length of time to defrost the food and warm it to eating temperature. In the past, the food or other commodity in the respective compartments has been unevenly heated unless it was left in the oven for an extended period at elevated temperature. Very often, in order to bring the entree, for instance, to desired heating temperature, the more delicate vegetable would be overcooked and even charred. If the period of heating was reduced, the bulkier and more heat stable items would then be undercooked.

The present invention overcomes the former difficulties and contemplates a modification of the container to accomplish the same. The lid 15, or other portion of the container, as will hereinafter be explained, is provided with an exterior surface which will thus be out of contact with food in the case of food containers, wherein a coating of a heat-absorbent material may be disposed thereon in a particular manner. That is, the area of the lid 15, identified by the reference numeral 20, which corresponds to the compartment 11 may be printed or painted with an over-all opaque, heat-absorbent black ink or an ink of another color, if so desired. Thus, the maximum in heat transmitting characteristics will thereby be transmitted to the adjacent compartment 11 when the lid 15 is seated on the container 10. The area 21 of the lid 15 covering the compartment 12 is preferably ruled with cross-hatching by means of printing or with other configuration wherein a relatively large amount of reflective material comprising the lid 15 will remain uncovered. Thus, it will be apparent that the compartment 12 will have transmitted thereto the least amount of heat in comparison with compartments 11 and 13. Of course, any of the compartments may be left uncoated should it be desired to have even a lesser amount of heat transmitted interiorly thereof. Such arrangement has been fully discussed in the aforementioned co-pending Griem application.

To vary the amount of heat transmission, for instance to the compartment 13, the lid area 22 covering that compartment may be printed or otherwise coated to include an even greater amount of heat-absorbent material as shown. It is further within the province of the present invention, but not specifically illustrated in the drawing, to vary the heat transmitting characteristics of respective compartments by changing the color of the heat absorbent material and varying its coverage of a selected area.

A series of tests have been made to bring forth the attributes of the present invention wherein individual dinner containers of the order illustrated in FIGS. 1 and 2 have been provided with a lid member 15 coated with printing ink in the manner disclosed in the view of FIG. 1. In this case the printing ink was black. The results of these tests are as follows:

Example 1

A conventional beef dinner including gravy and meat in one compartment, such as compartment 11; potatoes in a compartment, such as compartment 13; and a vegetable in a compartment, such as compartment 14, were taken directly from the freezer at a temperature of −30° F. One set of dinner containers, for comparison purposes, had a non-coated lid of regular reflective foil of 1½ mil thickness, whereas the other dinner container included a foil lid of the same thickness and coated in accordance with the teachings of the present invention. That is, the section corresponding to section 20 was printed with an opaque black ink, whereas the section of the lid corresponding to section 21 was printed with cross hatched ruling of a configuration disclosed in FIG. 1, wherein the ruled lines were of approximately 0.2 mm. in width dimension and the exposed reflecting square areas defined by the lines were approximately 1½ mm. at each side. The area of the foil corresponding to the area 22 of FIG. 1, adjacent to the compartment including the potatoes was more dense and defined by lines of approximately 0.2 mm. thickness each defining exposed reflective squares of approximately 1 mm. at a side and being further bisected by a diagonally ruled line of approximately 0.2 mm. width.

The dinner containers were each placed in a preheated oven at a temperature of 425° F. Each container was examined after the expiration of a 20 minute period, a 30 minute period and a 35 minute period measured from the start.

After 20 minutes:
    Dinner with uncoated foil—
        Vegetables—warm;
        Potatoes—cold;
        Gravy with meat—partially frozen.
    Dinner with coated foil—
        Vegetables—warm;
        Potatoes—warm;
        Gravy with meat—cold but unfrozen.

Neither dinner was done, but it will be apparent that there was a differentiation between coated and uncoated areas in the amount of heat transmitted to the respective compartments, especially in the cases of the potatoes and the meat courses.

After 30 minutes:
    Dinner with uncoated foil—
        Vegetables—hot;
        Potatoes—warm;
        Gravy and meat—cold.
    Dinner with coated foil—
        Vegetables—hot;
        Potatoes—hot;
        Gravy and meat—warm.
Neither dinner was done.

After 35 minutes:
    Dinner with uncoated foil—
        Vegetables—hot;
        Potatoes—hot;
        Gravy and meat—hot.
    Dinner with coated foil—
        Vegetables—hot;
        Potatoes—hot;
        Gravy and meat—hot.

Dinners were both heated to satisfactory eating temperature.

Example 2

In the present example conventional ham dinners, wherein ham with sauce, applesauce and lima beans had been previously placed in separate compartments, were defrosted to 0° F. before being placed in an oven preheated to 425° F.

After 20 minutes:
    Dinner with uncoated foil lid—
        °F.
        Applesauce _____ 154
        Lima beans _____ 138
        Ham with sauce _____ 128
    Dinner with coated foil lid—
        Applesauce _____ 178
        Lima beans _____ 142
        Ham with sauce _____ 145

Applesauce too cold to be eaten.

After 25 minutes:
    Dinner with uncoated foil lid—
        Applesauce _____ 185
        Lima beans _____ 170
        Ham with sauce _____ 142
    Dinner with coated foil lid—
        Applesauce _____ 190
        Lima beans _____ 182
        Ham with sauce _____ 154

Both dinners were suitable for eating.

Example 3

In the present example beef dinners were used which contained beef slices in gravy, peas and carrots, and potatoes in respective compartments. The dinners were defrosted to 0° F. before being placed in an oven preheated to 425° F.

After 20 minutes:
    Dinner with uncoated lid—
        °F.
        Peas and carrots _____ 115
        Potatoes _____ 98
        Gravy with meat _____ 125
    Dinner with coated foil—
        Peas and carrots _____ 138
        Potatoes _____ 122
        Gravy with meat _____ 155

After 25 minutes:
  Dinner with uncoated foil—
    Peas and carrots _____ 142
    Potatoes _____ 135
    Gravy with meat _____ 135
  Dinner with coated foil—
    Peas and carrots _____ 148
    Potatoes _____ 140
    Gravy with meat _____ 168

It will thus be apparent that, especially from Example 3, wherein the gravy and meat dinner was heated 25 minutes at 425° F., that the dinner achieved temperatures in an unprinted lid of 142° F. for the peas and carrots, 135° F. for the potatoes and 135° F. for the gravy with meat. In striking contrast, the lid embodying the present invention achieved a temperature of 148° F. for the peas and carrots, 140° F. for the potatoes and 168° F. for the meat with gravy. The most important part of the entire testing lay in the fact that wherein a frozen dinner is prepared, the container embodying the present invention achieved a 168° F. temperature for gravy and meat while holding the carrots and peas to 148° F. and potatoes to 140° F.

It will thus be apparent, that the present invention has provided a simple and improved means for thermally controlling the temperature to selected compartments of a compartmented container, wherein certain commodities, such as food, may be heated as a unitary assembly to various temperatures by merely controlling the amount of heat-absorbent material applied to an exterior surface of the container, such as a removable lid. The amount is specifically controlled by printing at localized areas throughout a given portion of the container or container surface and may take the form of a completely opaque area where it is desired to transmit the most heat and by spaced dispersion of printed configuration, applying the heat-absorbent material to a normally reflective surface, to obtain a lesser degree of heat transmission in areas where more of the original reflective material is exposed.

Having described my invention, what I claim as new and useful is:

1. In a container of unitary assembly having compartmented sections arranged to contain diverse selected commodities, said commodities respectively requiring relatively differing degrees of heat treatment; the combination therewith of a removable lid defining enclosing wall surface areas for each of said sections and being of normally heat-reflective material, the exterior surface of at least certain of said lid areas being coated with a heat-absorbent material selected to effect heat transmission characteristics to a respective one of said sections, the coating of a respective area being in selected spaced dispersion thereon so as to differ from the spaced coating dispersion upon the remaining areas of said lid so that each of said commodities will receive its proper uniform heat treatment when the container as a whole is subjected to a predetermined heat treatment.

2. A removable lid for a container having compartmented sections arranged to contain diverse selected commodities, said commodities respectively requiring relatively differing degrees of heat treatment, said lid comprising a flexible sheet defining enclosing wall surface areas corresponding to each of said sections and being of normally heat-reflective material, the exterior surface of at least certain of said lid areas being coated with a heat-absorbent material selected to effect heat transmission characteristics to a respective one of said sections, the coating of a respective area being in selected spaced dispersion thereon so as to differ from the spaced coating dispersion upon the remaining areas of said lid to bring each of said diverse commodities to its appropriate substantially uniform temperature upon subjecting said container to a predetermined heat treatment.

3. In a food container of stamped and formed sheet metal having compartmented sections arranged to contain diverse selected edible commodities and arranged to be filled and brought to freezing temperature along with its contents, said diverse commodities respectively requiring relatively differing degrees of substantially uniform heating prior to serving; the combination therewith of a removable lid defining enclosing wall surface areas of each of said sections and being of normally heat-reflective material, the exterior surface of at least certain of said lid areas being coated with a heat-absorbent material selected to effect heat transmission characteristics to a respective one of said sections, the coating of a respective area being in selected spaced dispersion thereon so as to differ from the spaced coating dispersion upon the remaining areas of said lid.

References Cited in the file of this patent

UNITED STATES PATENTS

| | | |
|---|---|---|
| 1,522,329 | Salucci _____ | Jan. 6, 1925 |
| 1,757,989 | Acton _____ | May 13, 1930 |
| 2,391,660 | Ward _____ | Dec. 25, 1945 |
| 2,875,683 | Burns _____ | Mar. 3, 1959 |

FOREIGN PATENTS

| | | |
|---|---|---|
| 336,029 | Germany _____ | Apr. 21, 1921 |

OTHER REFERENCES

"Pots and Pans," Home and Garden Bulletin No. 2, U.S. Department of Agriculture, August 1950, pp. 3, 4, and 26.